United States Patent [19]
Stephens

[11] Patent Number: 5,064,245
[45] Date of Patent: Nov. 12, 1991

[54] CHILD CAR SEAT PILLOW CONSTRUCTION

[76] Inventor: Gina L. Stephens, 1242 Aberdeen Dr., Broomfield, Colo. 80020

[21] Appl. No.: 594,627

[22] Filed: Oct. 9, 1990

[51] Int. Cl.$^5$ .............................................. A47C 7/36
[52] U.S. Cl. ................................. 295/397; 297/391
[58] Field of Search ............... 297/397, 391, 220, 250, 297/DIG. 3, DIG. 6, 464, 284, 486; 5/434, 441, 449, 455

[56] References Cited

U.S. PATENT DOCUMENTS

| | | | |
|---|---|---|---|
| 631,754 | 8/1899 | Sanders | 24/DIG. 22 X |
| 2,253,801 | 8/1941 | Neal | 5/455 |
| 3,894,797 | 8/1975 | Guust | 5/441 X |
| 4,345,345 | 8/1982 | Holtz | 5/441 X |
| 4,383,713 | 5/1983 | Raston | 297/397 X |
| 4,876,755 | 10/1989 | Parrish | 297/284 X |

FOREIGN PATENT DOCUMENTS 2194883 3/1988 United Kingdom ................ 297/397

Primary Examiner—Peter R. Brown
Assistant Examiner—Milton Nelson, Jr.
Attorney, Agent, or Firm—Leon Gilden

[57] ABSTRACT

A pillow construction for mounting and positioning adjacent a side rotating wall of an associated child car seat that includes an elongate tubular cushioned member mounting a pillow member at its upper terminal end. A modification of the invention includes the use of straps and clip members mounted to terminal ends of the straps for securement of the straps to the car seat organization. The flexible tube may be formed of separate pneumatic chambers, each employing an individual inflation valve.

1 Claim, 4 Drawing Sheets

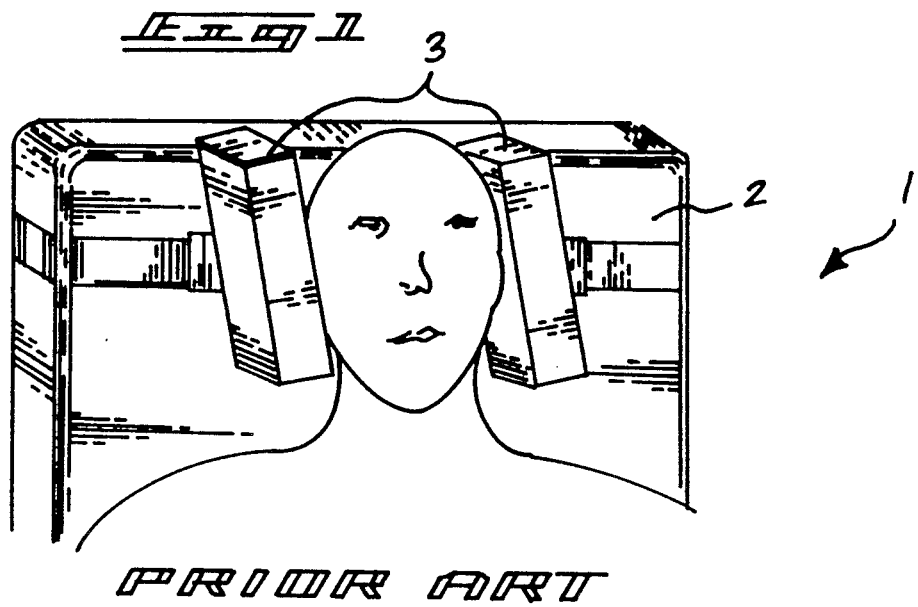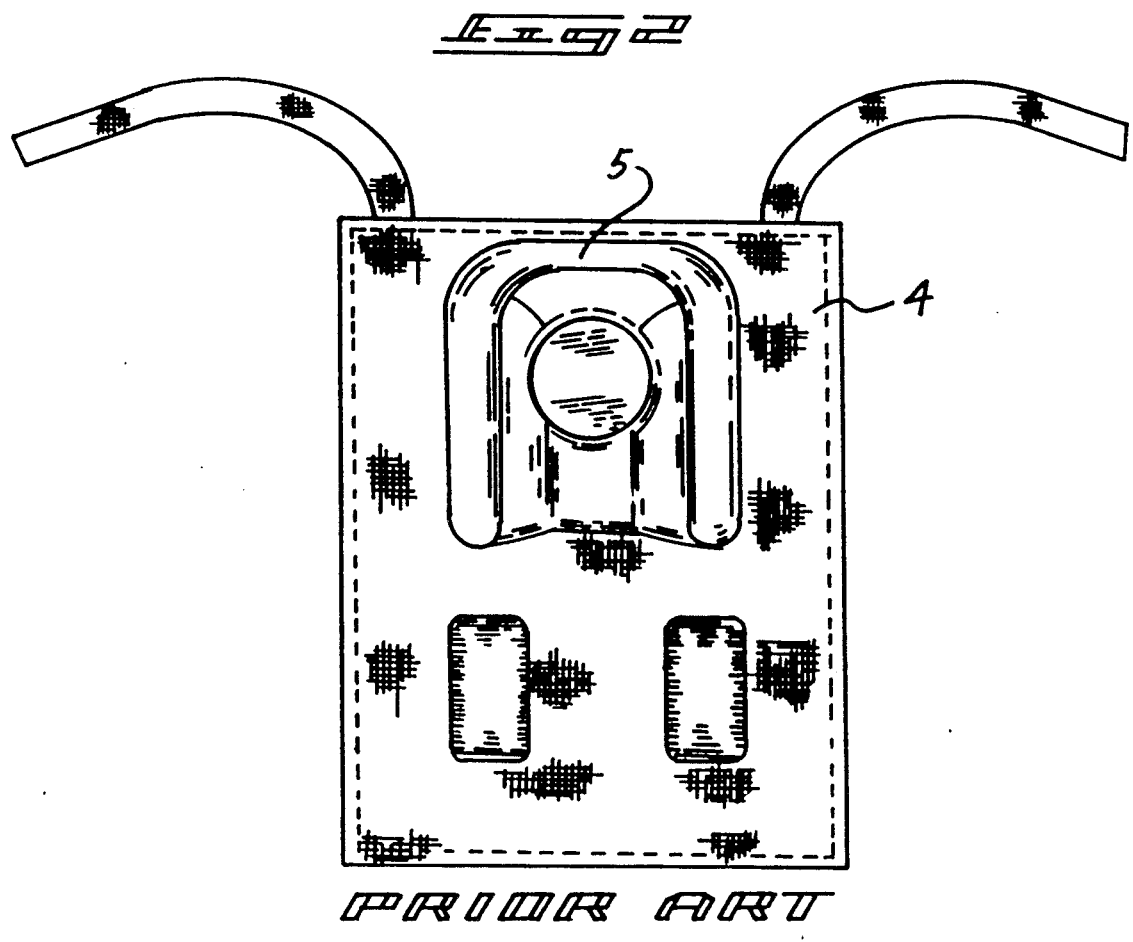

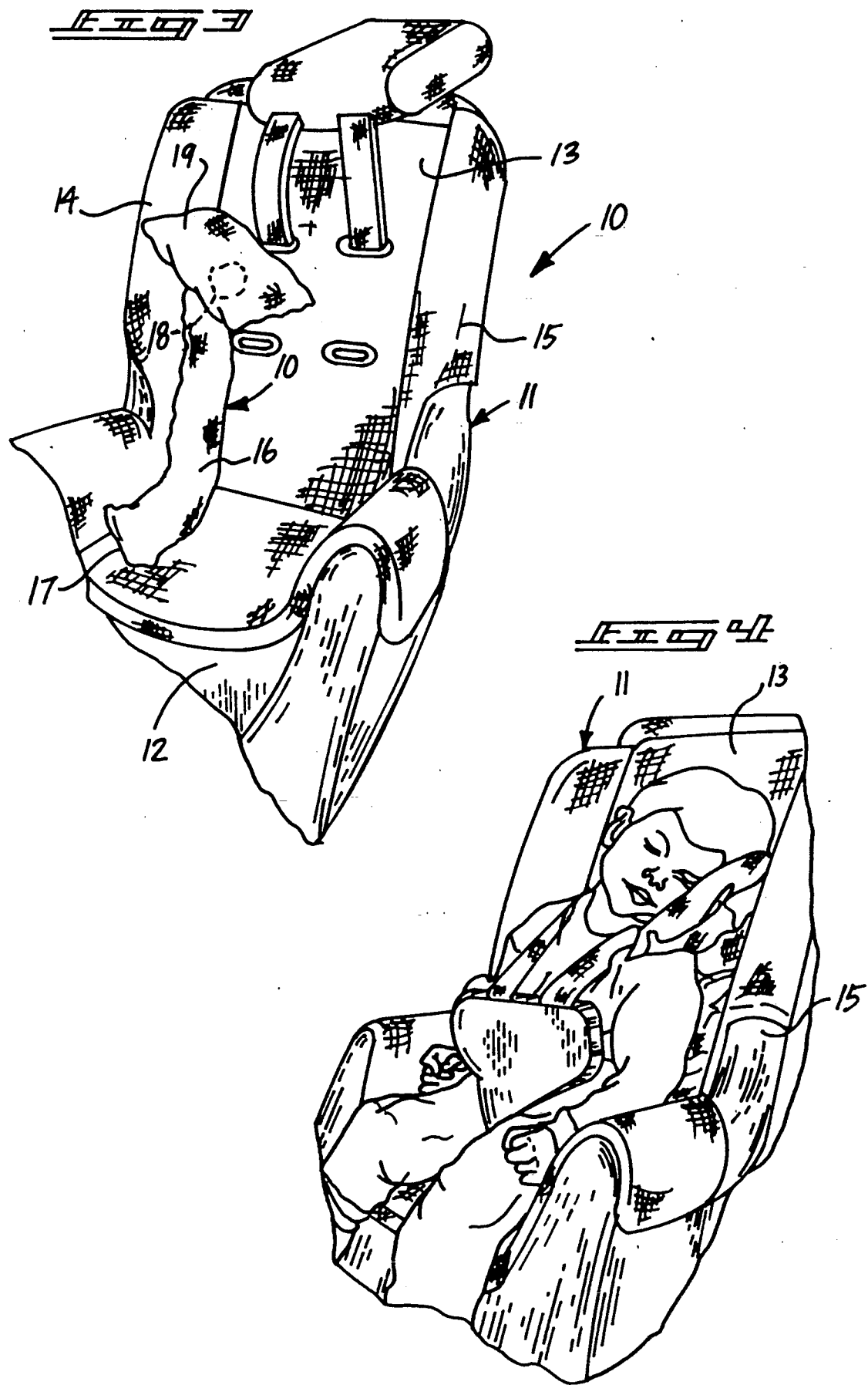

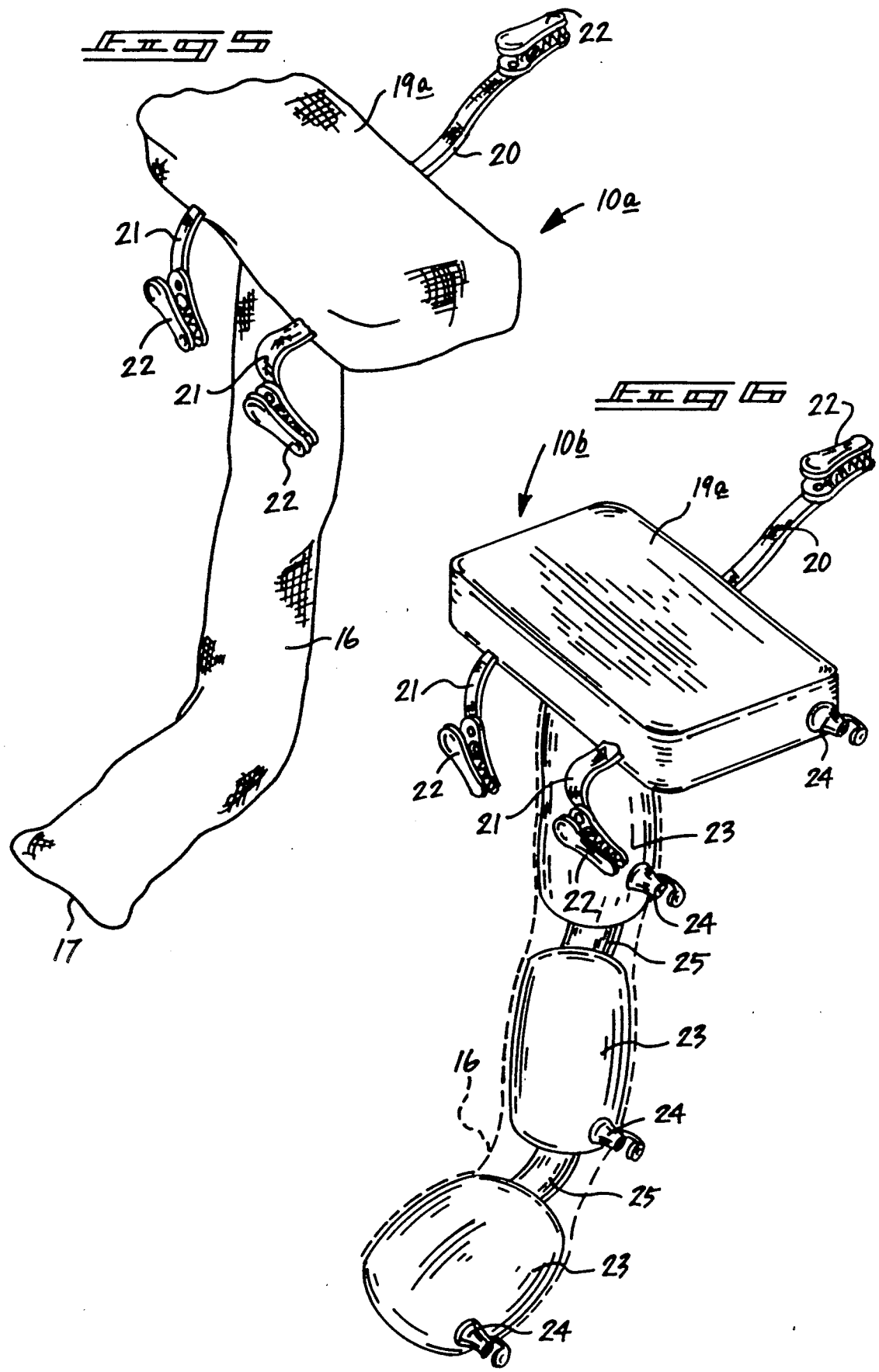

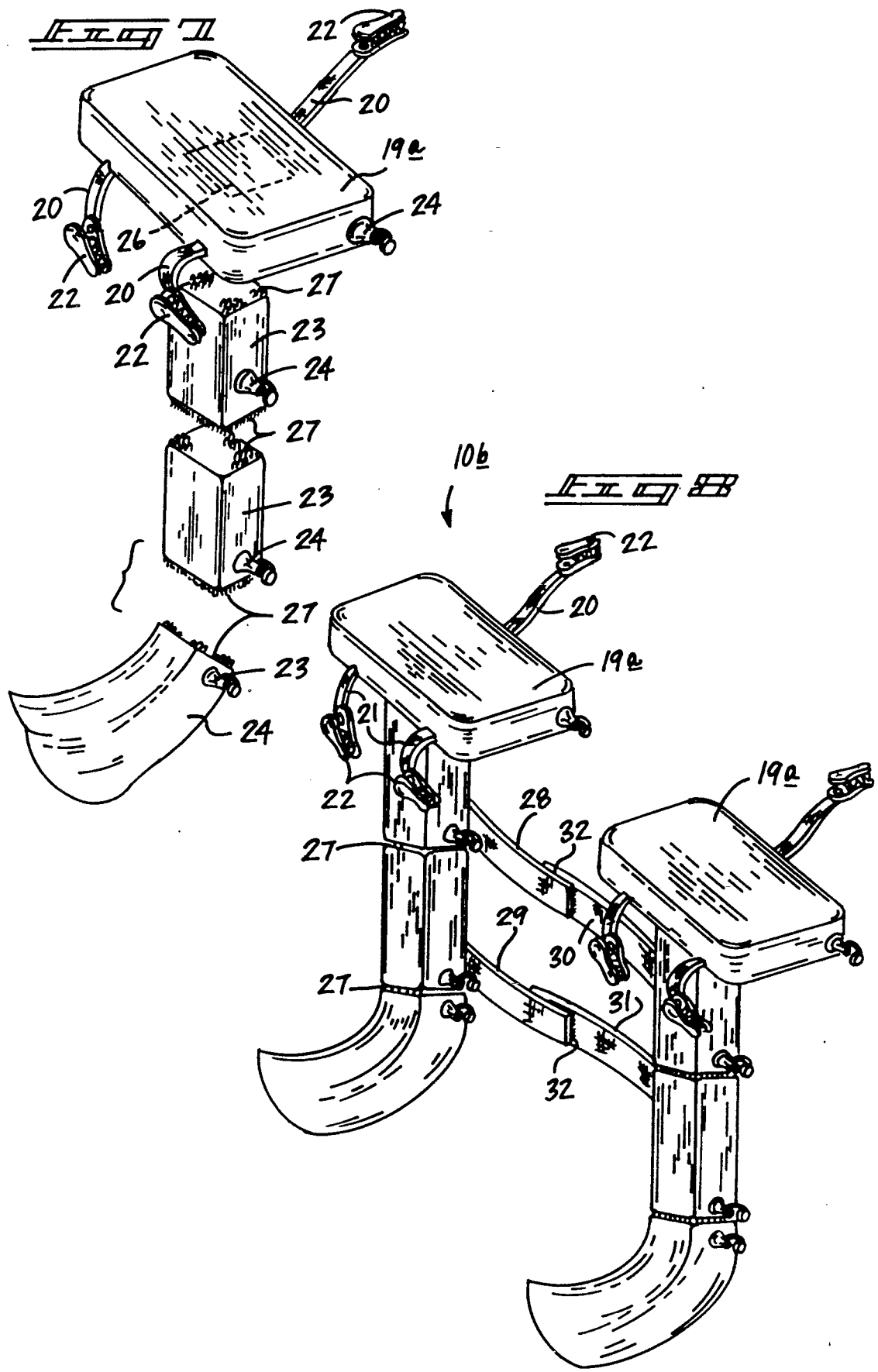

CHILD CAR SEAT PILLOW CONSTRUCTION

BACKGROUND OF THE INVENTION

1. Field of the Invention

The field of invention relates to car seat constructions, and more particularly pertains to a new and improved child car seat pillow construction wherein the same provides a pillow organization for mounting in association with an associated car seat.

2. Description of the Prior Art

Various pillows of differing configurations have been utilized by car seats to provide a stabilizing and support for a child during a sleeping interval while seated in position within a car seat. Prior art organization include U.S. Pat. No. 4,383,713 mounting a generally "U" shaped pillow to the seat to provide a stabilizing member for receiving a child's head therewithin.

U.S. Pat. No. 4,440,443 utilizes a "U" shaped pillow member mounted to an upper terminal end of a car seat for providing a privacy and enclosing chamber for mounting a child's head therewithin.

U.S. Pat. No. 4,154,478 sets forth head rest members mounted on a chair back to provide support for an individual's therebetween.

U.S. Pat. No. 4,565,405 provides a back rest mat, with a pad, with the pad including a plurality of padded projections for securing a child's head therebetween.

As such, it may be appreciated that there continues to be a need for a new and improved child car seat pillow construction as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of child car seat apparatus now present in the prior art, the present invention provides a child car seat pillow construction wherein the same utilizes a pillow member that is readily and conveniently mounted within a child's car seat for providing a head support for a child. As such, the general purpose of the present invention, which will be described subsequently in greater detail, is to provide a new and improved child car seat pillow construction which has all the advantages of the prior art child car seat pillow members and none of the disadvantages.

To attain this, the present invention provides a pillow construction for mounting and positioning adjacent a side rotating wall of an associated child car seat that includes an elongate tubular cushioned member mounting a pillow member at its upper terminal end. A modification of the invention includes the use of straps and clip members mounted to terminal ends of the straps for securement of the straps to the car seat organization. The flexible tube may be formed of separate pneumatic chambers, each employing an individual inflation valve.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved child car seat pillow construction which has all the advantages of the prior art child car seat pillow members and none of the disadvantages.

It is another object of the present invention to provide a new and improved child car seat pillow construction which may be easily and efficiently manufactured and marketed.

It is a further object of the present invention to provide a new and improved child car seat pillow construction which is of a durable and reliable construction.

An even further object of the present invention is to provide a new and improved child car seat pillow construction which is susceptible of a low cost of manufacture with regard to both materials and labor, and which accordingly is then susceptible of low prices of sale to the consuming public, thereby making such child car seat pillow constructions economically available to the buying public.

Still yet another object of the present invention is to provide a new and improved child car seat pillow construction which provides in the apparatuses and methods of the prior art some of the advantages thereof, while simultaneously overcoming some of the disadvantages normally associated therewith.

Still another object of the present invention is to provide a new and improved child car seat pillow construction wherein the same provides an elongate tubular child car seat pillow positionable against a side wall abutment formed by a child car seat member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 an isometric illustration of a prior art seat pillow organization.

FIG. 2 an orthographic view, taken in elevation, of a further prior art seat pillow organization.

FIG. 3 is an isometric illustration of the instant invention.

FIG. 4 an isometric illustration of the instant invention in use.

FIG. 5 is an isometric illustration of a modified pillow construction utilized by the instant invention.

FIG. 6 is an isometric illustration of a further modified pillow construction utilized by the instant invention.

FIG. 7 an isometric illustration of a yet further modified pillow organization utilized by the instant invention.

FIG. 8 is an isometric illustration of the pillow construction of FIG. 7 utilized in tandem.

DESCRIPTION OF THE PREFERRED EMBODIMENT

With reference now to the drawings, and in particular to FIGS. 1 to 8 thereof, a new and improved child car seat pillow construction embodying the principles and concepts of the present invention and generally designated by the reference numeral 10 will be described.

FIG. 1 illustrates a prior art pillow organization 1, wherein a back rest 2 includes a plurality of spaced pillow members 3 mounted upon the strap for securement to the back rest, in a manner as set forth in U.S. Pat. No. 4,154,478. A further example of a support for a child is set forth in FIG. 2, wherein a back rest 4 or mat construction provides a bowl-shaped member 5 for receiving a child's head therewithin, as set forth in U.S. Pat. No. 4,383,713.

More specifically, the child car seat pillow construction 10 of the instant invention essentially comprises the organization mounted and positioned within a car seat 11, that includes a seat member 12 and a back support member 13 defining a generally "L" shaped seat, with spaced "L" shaped right and left side retainer walls 14 and 15 coextensively formed to the car seat 11 to the sides of the seat and back members 12 and 13. The pillow construction includes an elongate deformable flexible cushion tube 16, including a closed and seamed lower end and a closed upper end 18 that in turn integrally and orthogonally mounts the rectangular cushion pillow member 19. The organization is arranged for mounting against the interior surface of either the left or right "L" shaped retainer wall for permitting a child, as illustrated in FIG. 4, to rest and position his head thereon to permit convenience and ease of sleeping within the car seat construction 11.

FIG. 5 illustrates a modified pillow construction 10a, wherein at least one right side strap 20 and at least one or a plurality of left side straps 21 each include an alligator type clip 22 mounted at a free terminal end thereof, wherein each alligator clip is defined by spring-biased tooth jaws that are biased together to permit the clips to engage various portions of the child's clothing or portions of the car seat 11 to enhance positioning of the pillow during use, in a predetermined orientation relative to the car seat 11. FIG. 6 illustrates a modified pillow cushion 19a formed as an inflatable chamber, including an inflation valve 24 mounted at an end thereof to permit selective inflation to a desired degree of rigidity of the modified pillow member 19a. Further, the flexible tube 16 includes a series of inflatable bladders 23. The inflatable bladders are each selectively secured relative to each other by a connecting web 25, and each include inflation valve 24. The inflatable bladders 23 are coextensively positioned and contained within the pillow member 19, with each inflation valve 24 projecting therethrough.

A further manner of securing the inflatable bladders 23 together is by providing a first hook and loop fastener surface 26 medially onto a bottom surface of the modified pillow member 19a to permit a securement of second hook and loop fastener surface 27 formed at each end of each inflatable bladders. This permits securement of a desired series of inflatable bladders together to selectively permit an individual to tailor a desired length of the tubular construction defined by inflatable bladders in conformity with the car seat 11 being utilized.

FIG. 8 illustrates a further modified pillow construction 10b, wherein a plurality of the inflation bladders defined by the top and medial inflation bladder each include a lateral belt defined by a respective first upper and first lower lateral belt 28 and 29 respectively mounted orthogonally to the top and medial inflation bladder, with a hook and loop fastener surface formed at a free terminal end of the first upper and lower lateral belt. This permits securement to a second car seat organization of identical construction utilizing a second upper and a second lower lateral belt orthogonally mounted to a respective second upper and second medial inflatable bladder that also includes a hook and loop fastening surface at a free terminal end thereof to permit securement of the respective first and second upper belts together and the first and second lower belts together to provide a generally "H" shaped construction that permits positioning of a pillow member adjacent each side retainer wall 14 and 15 for use by a child positioned within the seat. Further, the child's torso is positioned against the connected lateral belts to assist in positioning the pillow members within the car seat construction.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A child car seat pillow construction for use in combination with a car seat, wherein the car seat includes a generally horizontal seat member fixed mounted to a vertical back support member, and the seat member and the back support member defining a generally "L" shaped member that includes a right side and a left side, wherein right side includes a right side retainer wall and the left side includes a left side retainer wall, and the pillow construction includes an elongate deformable flexible tube member, the tube member includes a tube upper end, and the tube upper end orthogonally has mounted thereto a cushion pillow member, and wherein the pillow member includes a right side and a left side, wherein the right side includes at least one flexible strap and the left side includes at least one further flexible strap, and each flexible strap includes a clip mounted thereto to permit securement of each clip to the car seat and to the individual mounted within the car seat, and each clip includes a plurality of spring-biased jaws normally biased together in a closed configuration, and wherein the cushion pillow member is defined by an inflatable bladder, the inflatable bladder includes an inflation valve mounted at an end thereof to permit inflation of the inflation bladder to a desired pressure, and wherein the inflatable bladder includes a first hook and loop fastener surface mounted to a bottom surface of the inflatable bladder, and the flexible tube includes a plurality of pneumatic chambers, and wherein the plurality of pneumatic chambers includes a top pneumatic chamber, a medial chamber, and a bottom pneumatic chamber, the top pneumatic chamber includes a second hook and loop fastener surface formed at each end thereof, and the top pneumatic chamber is securable to the first hook and loop fastener surface formed to the bottom surface of the inflatable bladder, and wherein the top pneumatic chamber and the medial pneumatic chamber include a respective first upper and first lower lateral belt orthogonally mounted thereto, and each lateral belt includes a belt hook and loop fastener surface formed at a free terminal end of each lateral belt, and further including further cushion pillow member, and a further top pneumatic chamber, a further medial pneumatic chamber and a further pneumatic chamber mounted to the further cushion pillow member, and the further top pneumatic chamber including a second upper lateral belt, the further medial pneumatic chamber including a second lower lateral belt, wherein the second upper and lower lateral belts each include a belt hook and loop fastener surface mounted at a free terminal end thereof to permit securement of the first upper lateral belt to the second upper lateral belt to define a generally "H" shaped pillow construction member.

* * * * *